(12) United States Patent
Serizawa

(10) Patent No.: US 6,594,099 B2
(45) Date of Patent: Jul. 15, 2003

(54) APPARATUS FOR ERASING DATA STORED ON A MAGNETIC DISK

(75) Inventor: Kohji Serizawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 09/854,740

(22) Filed: May 14, 2001

(65) Prior Publication Data

US 2001/0043420 A1 Nov. 22, 2001

(30) Foreign Application Priority Data

May 16, 2000 (JP) ........................................ 2000-144015

(51) Int. Cl.[7] ................................................ G11B 5/03
(52) U.S. Cl. .......................... 360/66; 360/137; 361/149
(58) Field of Search ................... 361/151, 149; 360/137, 66, 57

(56) References Cited

U.S. PATENT DOCUMENTS 3,869,713 A * 3/1975 Owens, Jr. ................... 360/66
4,847,727 A * 7/1989 Spaman ...................... 361/151
5,721,665 A * 2/1998 Schultz ....................... 361/149

FOREIGN PATENT DOCUMENTS

| DE | 3708540 A1 | 3/1987 | |
| JP | 05342679 A1 * | 12/1993 | 360/66 |
| JP | 7-29106 | 1/1995 | |
| WO | WO98/49674 | 11/1998 | |

* cited by examiner

*Primary Examiner*—Alan T Faber
(74) *Attorney, Agent, or Firm*—Robert B. Martin; Bracewell & Patterson, L.L.P.

(57) ABSTRACT

A data eraser applies a strong magnetic field to a magnetic disk while suppressing the strength of a magnetic field applied to a spindle motor. The data eraser includes an upper magnet fixer, a lower magnet fixer, and a linkage. The upper magnet fixer fixes one set of permanent magnets and the lower magnet fixer fixes another set of permanent magnets. The plate members are provided at the tips of the upper and lower magnet fixers. The plate members are made of a soft magnetic material, for example, JIS SS400, respectively. Each of these plate members functions as a yoke.

13 Claims, 9 Drawing Sheets

APPARATUS FOR ERASING DATA STORED ON A MAGNETIC DISK

BACKGROUND OF THE INVENTION

1. Technical Field

The present invention relates to a device for erasing data, for example, servo data stored on a magnetic disk.

2. Description of the Related Art

A typical disk device comprises a magnetic disk; a spindle motor for rotating the magnetic disk; a head for writing/reading data on/from the magnetic disk, etc. Such a disk device also has a case referred to as an enclosure case used to house the magnetic disk, the spindle motor, the head, etc. On the magnetic disk is formed a data storing layer by means of sputtering. The data storing layer consists of a magnetic thin film formed on the surface of a substrate consisting of glass or such a non-magnetic material as Al or the like. Generally, the enclosure case comprises a box-like base having an opening and a plate-like top cover for covering the opening of the base.

The disk device, after assembling the magnetic disk, the spindle motor, and other components in the base, is completed by covering the opening of the base with the top cover. After this assembling, servo data, which is position data of the magnetic disk, is written on the magnetic disk together with other necessary data. The disk device, when such servo data is written thereon, is put to various performance tests in prior to the delivery. Some disk devices are judged as defective ones in these tests. Defective disk devices are disassembled so that non-defective parts are collected and reused. Before a magnetic disk is reused, however, the servo data must be erased from the disk so as to prevent the servo data written newly on the disk from interference with the old one. And, if the servo data itself is judged to be imperfect, the servo data must also be erased. Some data is also written in the above tests and such test data must be erased from the defective disk devices.

The official gazette of Japanese Published Unexamined Patent Application No. 7-29106 discloses an effective technique for erasing such data from a magnetic disk. According to the technique, a rod provided with a permanent magnet is inserted between rotating magnetic disks, thereby erasing data from those magnetic disks. Although the method disclosed in Application No. 7-29106 is effective, it is premised here that a rod provided with a permanent magnet is inserted between magnetic disks. Consequently, when magnetic disks are loaded in the above disk device, the enclosure case of the disk device becomes an obstacle, so that the rod provided with the permanent magnet cannot be inserted between the magnetic disks. In some case, therefore, the magnetic disks are unloaded from the disk device so as to erase data therefrom. For example, imperfectly written servo data can be erased while magnetic disks are loaded in the disk device. Thus, the technique disclosed in Application No. 7-29106 cannot respond to necessary requirements.

A disk device that can erase data from magnetic disks loaded in a disk device is disclosed in International Publication WO98/49674. This disk device will be described below with reference to FIGS. 11 through 13.

As shown in FIG. 11, a data eraser 400 comprises an upper magnet fixer 402, a lower magnet fixer 404, and a linkage 406. The upper magnet fixer 402 fixes permanent magnets 412 and 414 and the lower magnet fixer 404 fixes permanent magnets 416 and 418. The permanent magnets 412 and 414 are adjoining so that their different poles attract each other. The permanent magnets 416 and 418 are also adjoining so that their different poles attract each other. The permanent magnets 412 and 416 face each other in the vertical direction while different poles are disposed on opposed surfaces of the permanent magnet 412 and the permanent magnet 416. The permanent magnets 414 and 418 also face each other in the vertical direction, but different poles are disposed on opposed surfaces of the permanent magnet 414 and the permanent magnet 418.

FIG. 12 is an explanatory view of a magnetic field formed by the data eraser 400 shown in FIG. 11. As shown in FIG. 12, the magnetic field is generated almost in the center of the data eraser 400, mainly oriented in the horizontal direction. At present, the horizontal magnetic recording method is employed for magnetic disks. In order to erase data from such a magnetic disk, therefore, a magnetic field must be applied in the direction parallel to the magnetic disk. In addition, the strength of the magnetic field must be larger than the coercive force of the magnetic disk.

FIG. 13 shows a method for erasing data stored on a magnetic disk 22 with use of the data eraser 400. In FIG. 13, the top cover is removed so as to show the movement of the components in the disk device clearly. A magnetic disk 22 is rotated at first. A spindle motor in the disk device 10 is driven to rotate the magnetic disk 22. Next, the disk device 10 is inserted into a gap between the upper and lower magnet fixers 402 and 404 of the data eraser 400. At this time, the data eraser 400 is inserted so that its side where a head slider S does not exist is inserted between both fixers 402 and 404 and the head slider S is retreated as shown with an arrow in FIG. 13. This is to block the influence of a magnetic field generated by the data eraser 400. In this state, if the magnetic disk 22 is kept rotated, a magnetic field is applied to the whole surface of the magnetic disk 22 in parallel, thereby data is erased from the magnetic disk 22.

In order to erase data stored on a magnetic disk, a magnetic field that is over the coercive force of the magnetic disk must be applied onto the magnetic disk. In recent years, the recording density of such the magnetic disk has been improved remarkably, thereby the coercive force of the magnetic disk is also increased significantly. This is why a magnetic field is required that has enough strength to erase data stored on the magnetic disk.

In some cases, a magnetic disk is unloaded from the object disk device when data is also erased from the disk. As described above, however, data is erased from a magnetic disk loaded in the disk device, of course. The disk device has a spindle motor for rotating the magnetic disk and this spindle motor has a permanent magnet. The spindle motor is disposed in the center of the rotation of the magnetic disk. Consequently, if a strong magnetic field is applied to the magnetic disk so as to erase data therefrom, the magnetic field becomes a demagnetizing field of the permanent magnetic of the spindle motor, thereby it causes the characteristics of the spindle motor to be degraded. In order to improve the coercive force of the magnetic disk, it is just required to apply a stronger magnetic field to the magnetic disk, but this causes the characteristics of the spindle motor to further be degraded at the same time.

Under such circumstances, it is an object of the present invention to provide a data eraser that can apply a strong magnetic field to the magnetic disk while suppressing the strength of the magnetic field to be applied to the spindle motor.

SUMMARY OF THE INVENTION

The present invention provides a data eraser that erases data stored on a magnetic disk as described above. The data eraser comprises magnetic field generating means having two permanent magnets, each of which forms different poles, are disposed so that different poles adjoin on both an obverse and a reverse thereof; and a yoke disposed on a surface except either the obverse or the reverse of the magnetic field generating means. This data eraser erases data from the magnetic disk with use of a leaked magnetic flux from each of the obverse and the reverse on which different poles are adjoining. Consequently, the magnetic flux from either the obverse or reverse of the magnetic field generating means is not required originally so as to erase data. And, it is important to block such the unnecessary leaked magnetic flux that will affect the permanent magnet of the spindle motor.

To avoid such the problem, therefore, the data eraser of the present invention disposes the yoke on the surface except either the obverse or the reverse of the magnetic field generating means, thereby eliminating a magnetic flux to be leaked to the external space. Consequently, it is possible to reduce the influence of the magnetic field to be imposed on the spindle motor. In addition, the data eraser of the present invention can erase data not only from a magnetic disk loaded in a disk device, but also from a magnetic disk unloaded from the disk device. The yoke disposed on the surface except either the obverse or the reverse of the magnetic field generating means as described above may also be disposed so as to come in contact with the magnetic field generating means or so as to be separated slightly therefrom.

In the data eraser of the present invention, a pair of the magnetic field generating means should preferably be disposed so that different poles adjoin on their opposed surfaces of one magnetic field generating means with a predetermined gap therebetween and the magnetic disk is inserted in the gap, thereby applying a magnetic field to the magnetic disk. A pair of the magnetic field generating means, when disposed so that different poles of each permanent magnet face their opposed poles respectively, cause magnetic fields generated from them to repulse each other, thereby forming a magnetic field area consisting mainly of a component oriented in the direction parallel to the magnetic field generating means. Consequently, if a magnetic disk is inserted in the area in parallel to the magnetic field generating means, it is possible to erase data from the magnetic disk effectively.

Furthermore, the data eraser of the present invention may also be provided with a fixer for fixing a pair of the magnetic field generating means with a predetermined gap therebetween so that this fixer functions as the yoke described above. Concretely, the fixer is just required to be composed of a strong magnetic material. The fixer, when composed such way, will be able to suppress the leakage of the unnecessary magnetic flux to the external space.

Furthermore, the present invention provides a data eraser for erasing data stored on a magnetic disk. The data eraser comprises magnetic field generating means having two permanent magnets on both an obverse and a reverse thereof and a pole piece provided on either the obverse or reverse. Each of the permanent magnets forms different poles that are adjoining on both an obverse and a reverse of the magnetic field generating means. A magnetic field formed by a magnetic flux leaked from the obverse or reverse on which the pole piece is located erases data from the magnetic disk. In this data eraser, the pole piece has a function for aligning the magnetization vector of the magnetic field generated by the magnetic field generating means in orientation.

This alignment of the magnetization vectors to the tangent line of the magnetic disk is a requirement for erasing data from the magnetic disk. Consequently, if the magnetization vector is not aligned such way, a stronger magnetic field must be applied to the magnetic disk. And, this means that a strong magnetic field is applied to the permanent magnet of the spindle motor. On the contrary, if the magnetization vectors are aligned, the magnetic field may be weaker than that when not aligned for erasing data from the magnetic disk. Consequently, the magnetic field to be applied to the permanent magnet of the spindle motor becomes weak relatively.

In the above described data eraser, when erasing data, the magnetic field should preferably consist of a component oriented in parallel to the magnetic disk in the area where the magnetic disk is disposed.

Furthermore, in the above described data eraser, a pair of the magnetic field generating means can be disposed so that their surfaces on which different poles are adjoining are opposed to each other with a predetermined gap therebetween. And, the pole piece can be located on those opposed surfaces of a pair of the magnetic field generating means respectively.

Furthermore, the present invention provides a data eraser for erasing data stored on a magnetic disk. The data eraser includes magnetic field generating means and a fixer. The magnetic field generating means has two flat permanent magnets forming different poles respectively on an obverse and a reverse thereof so that the different poles adjoin on each of the obverse and the reverse. The fixer fixes the magnetic field generating means. Each of the two flat permanent magnets is increased in volume from the boundary between them or around the boundary towards outside.

In the above data eraser, a pair of the magnetic field generating means are disposed so that their surfaces on which different poles are adjoining are opposed to each other with a predetermined gap therebetween. And, the magnetic disk is inserted in the predetermined gap, thereby applying a magnetic field to the magnetic disk. The disk device can thus be inserted in the predetermined gap so that the center of the disk rotation is positioned at the boundary between the generators or around the boundary. Consequently, it is possible to improve the strength of the magnetic field to be applied to the magnetic disk while suppressing the strength of the magnetic field to be applied to the spindle motor of the disk device. The magnetic field in the data eraser should preferably be oriented towards the tangent line of the magnetic disk.

Furthermore, the present invention provides a data eraser for erasing data stored on a magnetic disk loaded in a disk device. The data eraser includes magnetic field generating means having two flat permanent magnets, each of which forms different poles, are disposed so that different poles adjoin on both an obverse and a reverse thereof; and a pole piece having a notch on part of itself is disposed on either the obverse or the reverse of the magnetic field generating means. The two flat permanent magnets are increased in volume from the boundary between them or around the boundary towards outside. In this data eraser, the use of the pole piece having such a notch makes the magnetization vectors to be distributed in uniform and an amount of the magnetic flux to be leaked into the external space, that is, the strength of the magnetic field to be adjusted partially.

In such the data eraser, a pair of the magnetic field generating means are disposed so that the surfaces on which different poles are adjoining are opposed to each other with a predetermined gap therebetween and the magnetic disk is inserted in the gap, thereby applying a magnetic field to the magnetic disk. While the magnetic disk is inserted in the predetermined gap, the notch of the pole piece should preferably come closer to the rim of the magnetic disk.

DETAILED DESCRIPTION OF THE PREFERRED EMBODIMENT

Hereunder, the preferred embodiments of the present invention will be described with reference to the accompanying drawings.

Figure 10:
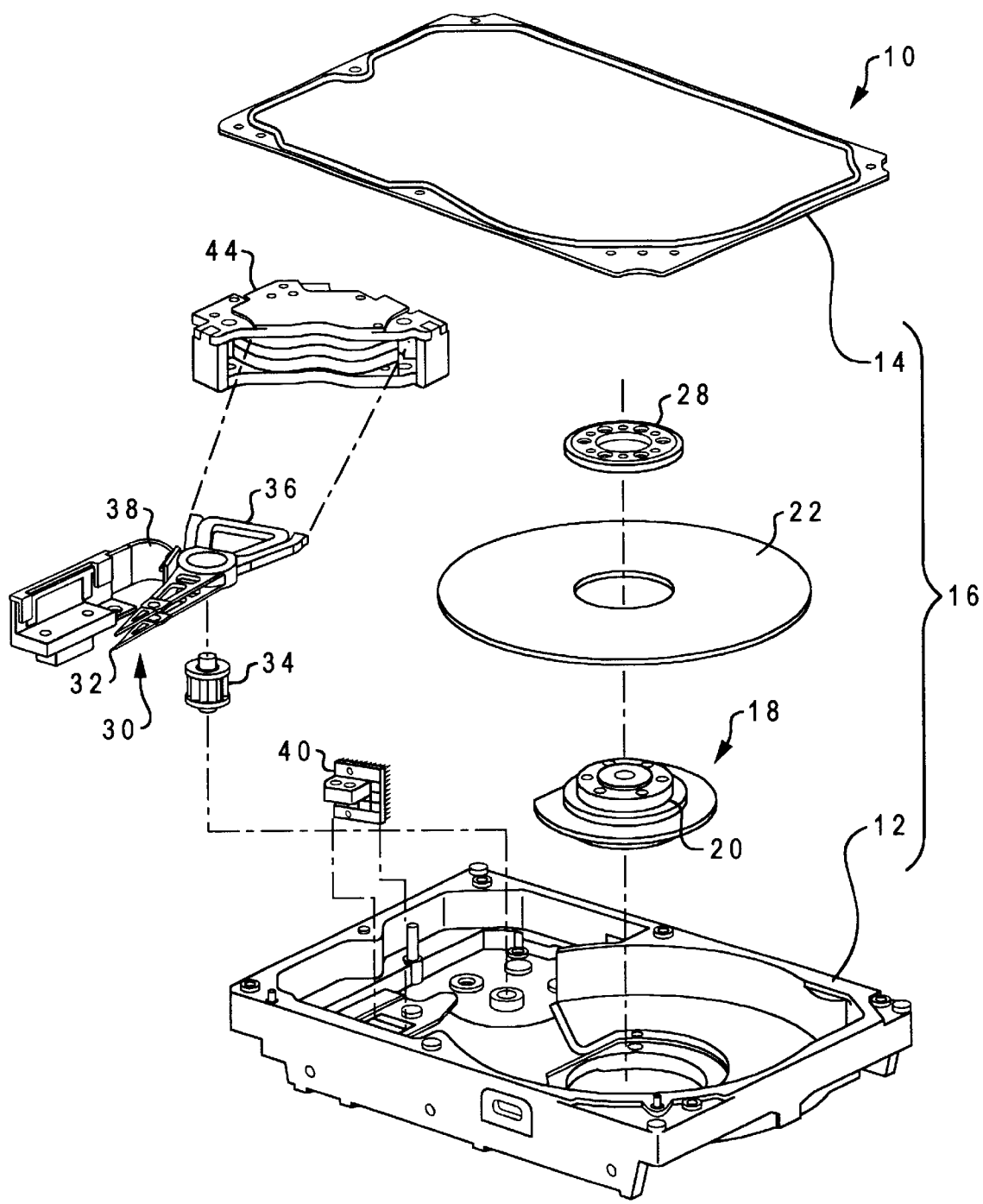
FIG. 10 is an exploded perspective view of a disk device 10 from which data is to be erased.
Figure 11:
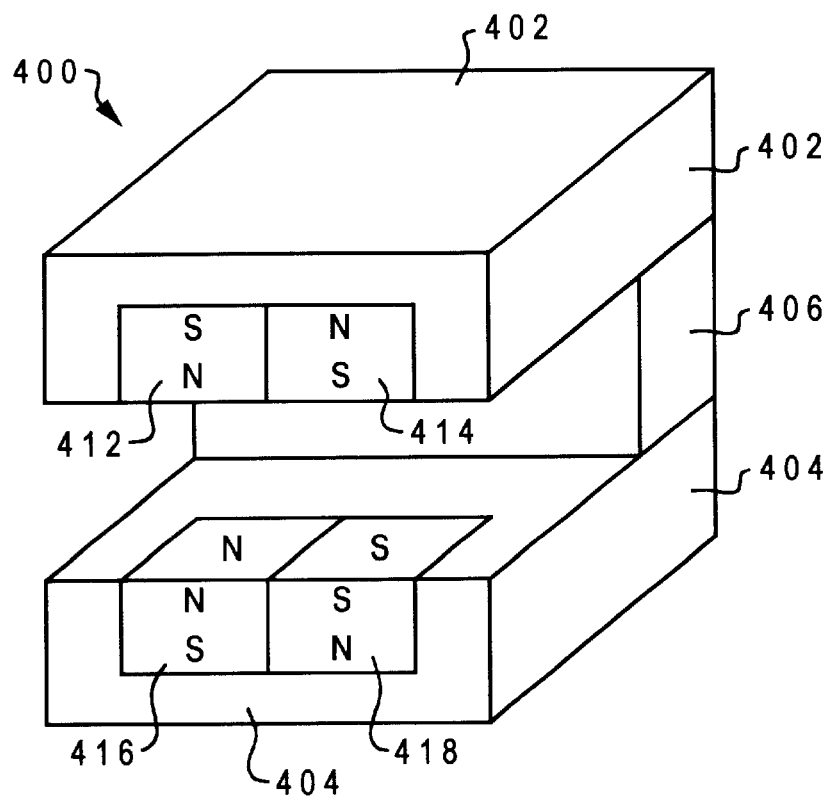
FIG. 11 is a perspective view of a conventional data eraser 400.
Figure 12:
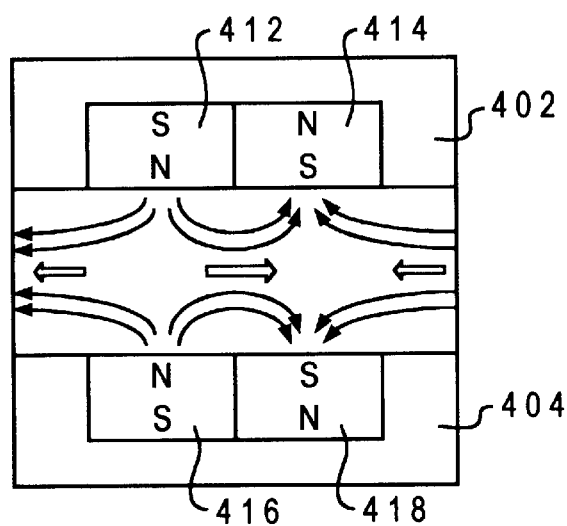
FIG. 12 shows an explanatory view of a magnetic field formed by the data eraser 400.

FIG. 10 shows an exploded perspective view of a disk device to which a data eraser of the present invention applies. As shown in FIG. 10, a disk device 10 has a case, that is, an enclosure case. The enclosure case is composed when the opened top of the shallow box-like base 12 made of an aluminum alloy is closed by a top cover 14. This enclosure case 16 is formed like a rectangular shallow box as described above and it can be disposed horizontally in a computer or keyboard.

The SUS-made top cover 14 is screwed to the base 12 via a rectangular frame-like sealing material (not illustrated) so as to close the enclosure case air-tight. In this enclosure case 16 is provided a hub-in structured spindle motor 18, which is positioned slightly closer to the end of the base 12 from the center. On the top surface of the hub 20 of this spindle motor 18 is fixed a magnetic disk 22 composed of a glass substrate by a top clamp 28 and rotated by the spindle motor 18. The magnetic disk 22 is a disk-like storing medium for writing/reading data thereon/therefrom. Data is written on a magnetic thin film (not illustrated) formed on the glass substrate. This spindle motor 18 has a permanent magnet (not illustrated) built in itself.

In the enclosure case 16 is provided an actuator 30. This actuator 30 has a magnetic head 32 disposed at its one end. The middle portion of the actuator 30 is supported on the base 12 via a pivot 34, so that the actuator 30 can be rotated freely around the pivot 34. A VCM (voice coil motor) coil 36 is provided at the other end of the actuator 30. A VCM 44 provided in the enclosure case 16 works together with this VCM coil 36 so as to rotate the actuator 30.

A card (circuit board) (not illustrated) is attached onto the outer (bottom) surface of the base 12. This card is rectangular in shape and large enough to cover the outer surface of the base 12. Such inputs/outputs as an electric power, signals, etc. for driving the motor are exchanged between the card and the spindle motor 18. Such inputs/outputs as an electric power for driving the VCM coil 36, as well as signals used for reading the head 32 and for other actions are exchanged between the card and the actuator 30. A flexible cable (FPC) 38 is used for such inputs/outputs between the card and the actuator 30.

The disk device 10 in this embodiment is referred to as a head loading/unloading disk device. This head loading/unloading disk device 10 enables the actuator 30 to be held by a lamp block 40 in its no operation so as to unload the head 32 to its retrieval position, so that the head 32 does not come in contact with the surface of the magnetic disk 22. The actuator 30 is driven during an operation, thereby the head 32 is positioned on the magnetic disk 22.

Figure 1:
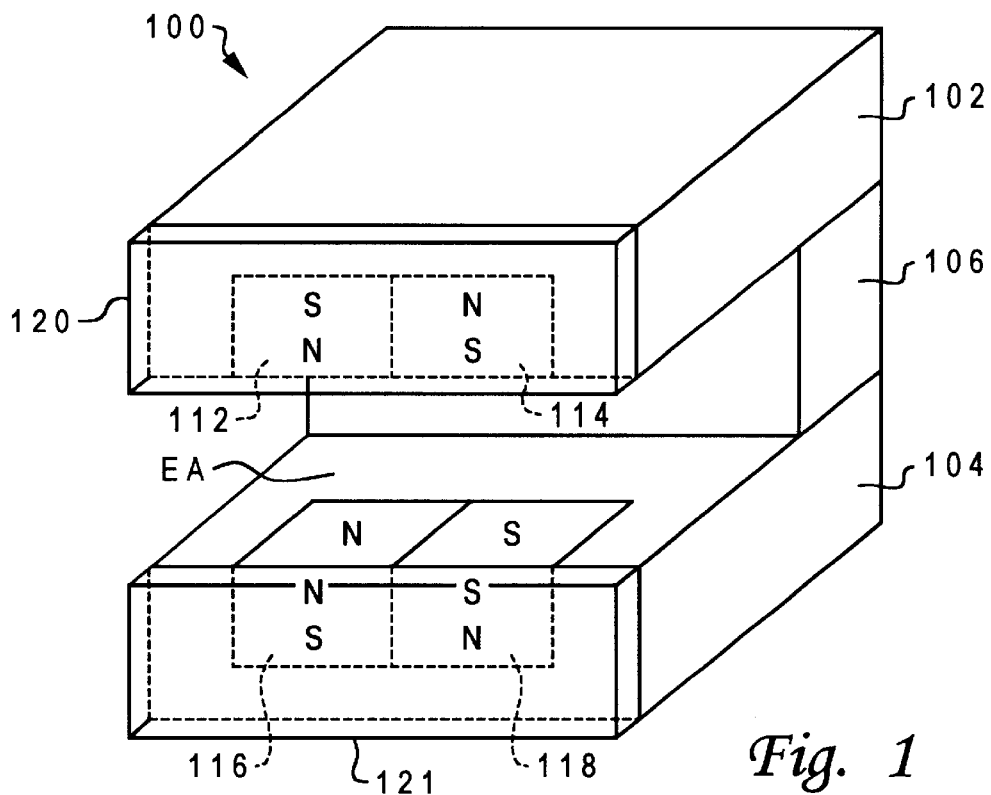
FIG. 1 is a perspective view of a data eraser 100 in the first embodiment of the present invention.
Figure 13:
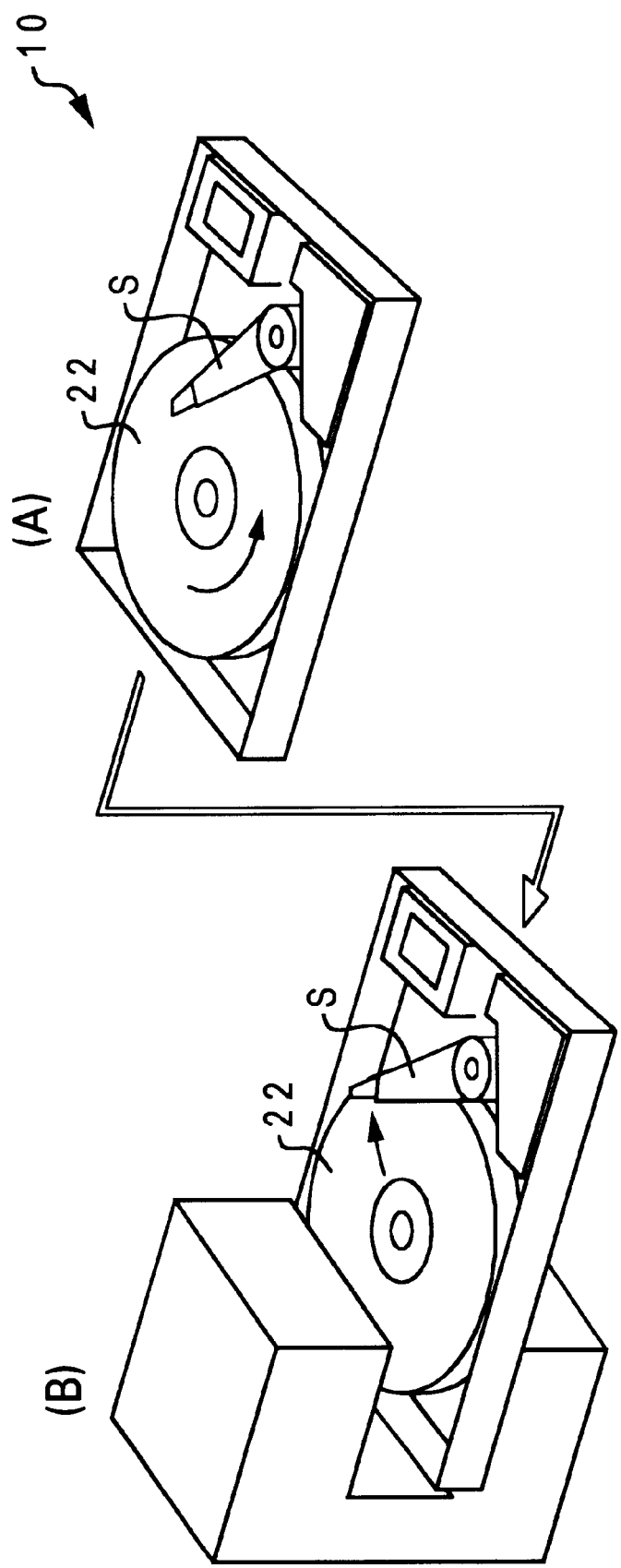
FIG. 13 shows how to erase data written on the magnetic disk 22 with use of the data eraser 400.

FIG. 1 is a perspective view of the data eraser 100 in the first embodiment of the present invention. As shown in FIG. 1, the data eraser 100 comprises an upper magnet fixer 102; a lower magnet fixer 104; and a linkage 106. The upper magnet fixer 102 fixes permanent magnets 112 and 114 and the lower magnet fixer 104 fixes permanent magnets 116 and 118. The upper and lower magnet fixers 102 and 104, as well as the linkage 106 are made of a strong magnetic material, for example, JIS SS400 respectively. Consequently, each of the upper and lower magnet fixers 102 and 104, as well as the linkage 106 functions as a yoke. A gap between the upper and lower magnet fixers 102 and 104 is a data erasure area EA used for inserting the disk device 10 so as to erase data from the magnetic disk 22. The disk device 10 is inserted in this data erasure area EA as shown in FIG. 13 when data is to be erased from the magnetic disk 22.

The permanent magnet 112 is disposed so that the top in FIG. 1 becomes the S pole and the bottom becomes the N pole and the permanent magnet 114 is disposed so that the top becomes the N pole and the bottom becomes the S pole. Concretely, the permanent magnets 112 and 114 are adjoining so as to attract each other. On the other hand, the permanent magnet 116 is disposed so that the top in FIG. 1 becomes the N pole and the bottom becomes the S pole and the permanent magnet 118 is disposed so that the top becomes the S pole and the bottom becomes the N pole. Concretely, the permanent magnets 116 and 118 are adjoining so as to attract each other. Each of the permanent magnets 112, 114, 116, and 118 functions as magnetic field generating means. If each of those permanent magnets is regarded as such magnetic field generating means, different poles are adjoining on both an obverse and a reverse thereof.

The permanent magnets 112 and 116 that face each other in the vertical direction have the same polarity on their opposed surfaces. The permanent magnets 114 and 118 that face each other also have the same polarity on their opposed surfaces. Consequently, the permanent magnets 112 and 116, as well as the permanent magnets 114 and 118 repulse each other. The magnetic field formed in the data erasure area EA is oriented in the horizontal direction due to this repulsion. In addition, if the disk device 10 is inserted in the data erasure area EA as described with reference to FIG. 13, the orientation of the magnetic field matches with the tangent line of the magnetic disk 22.

The permanent magnets 112, 114, 116, and 118 can be made of a conventional known permanent material respectively, but they should preferably be made of Nd—Fe—B, which has a high magnetic flux density, so as to erase data from the magnetic disk 22 having a high coercive force.

In this embodiment, plate members 120 and 121 made of a strong magnetic material respectively, for example, JIS SS400 are provided at the tips of the upper and lower magnet fixers 102 and 104. This plate member 120 prevents the ends of the permanent magnets 112 and 114 in the horizontal direction in FIG. 1 from contact with the external space. And, the plate member 121 prevents the ends of the permanent magnets 116 and 118 in the horizontal direction in FIG. 1 from contact with the external space.

As described above, the data eraser 100 comprises the upper and lower magnet fixers 102 and 104, a linkage 106, and plate members 120 and 121, all of which are made of the strong magnetic material. Concretely, every component except for the permanent magnets 112, 114, 116, 118 functions as a yoke for the permanent magnets 112, 114, 116, and 118. In the data eraser 100, therefore, a magnetic flux leaks directly to the external space only from a component facing the data erasure area EA. Other magnetic fluxes generated from the permanent magnets 112, 114, 116, and 118 never leak. And, most of those magnetic fluxes pass through the upper and lower magnet fixers 102 and 104, as well as the linkage 106 and the plate members 120 and 121 that are all functioning as a yoke respectively. This is because no magnetic flux leaks to external spaces other than the data erasure area EA and if a magnetic flux leaks to any of those places, it affects external devices adversely. Especially, if a leaked magnetic flux is applied to the spindle motor 18 of the disk device 10, the permanent magnet of the spindle motor 18 will be demagnetized. In the first embodiment, therefore, the plate members 120 and 121 are provided especially so as to suppress the adverse influence of a leaked magnetic flux on the permanent magnet of the spindle motor 18. Hereunder, a description will be made for how the permanent magnet of the spindle motor 18 is protected from an adverse influence of such a leaked magnetic flux.

Figure 2:
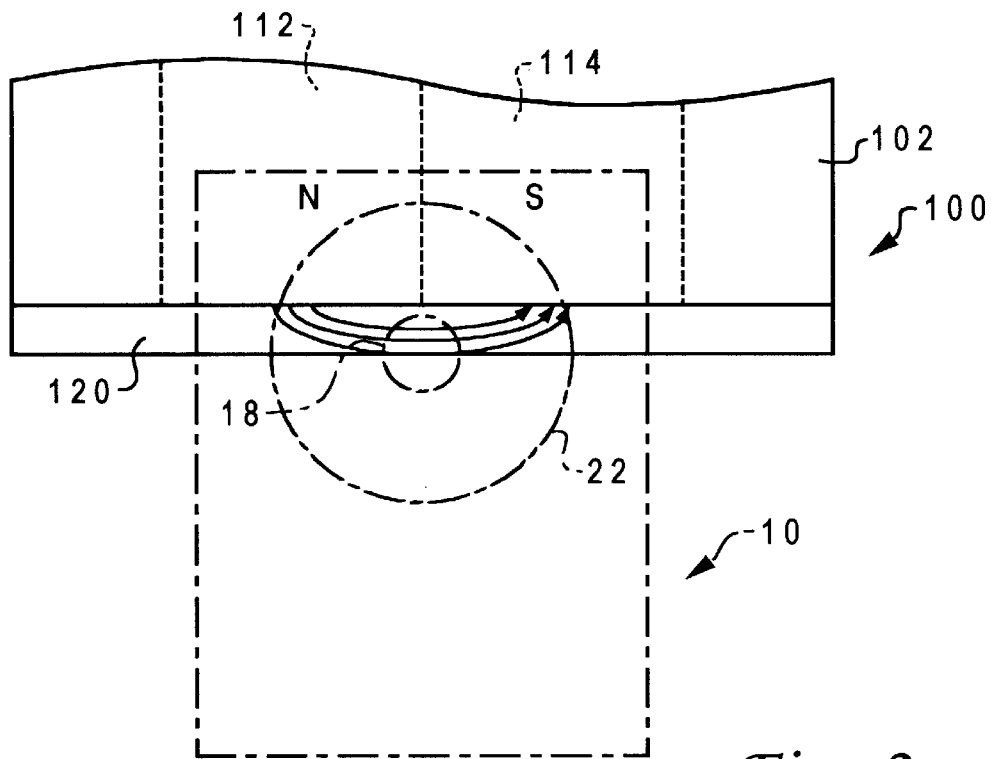
FIG. 2 shows a leaked magnetic flux when the data eraser 100 is seen from an upper magnet fixer 102 side.
Figure 3:
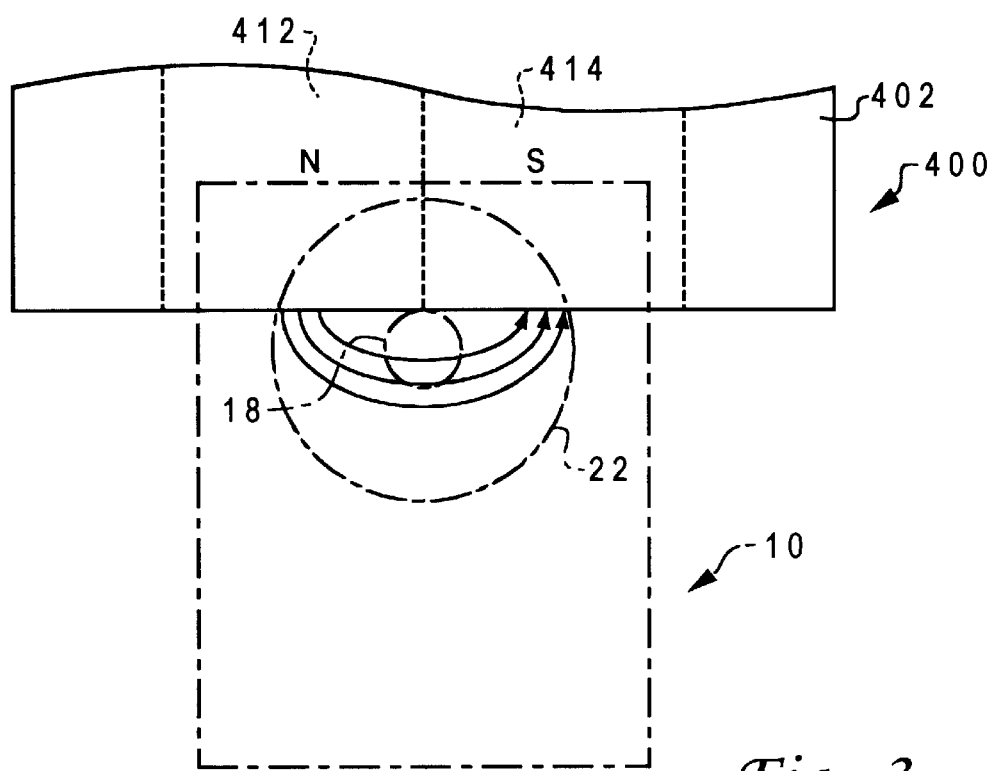
FIG. 3 shows a leaked magnetic flux when a conventional data eraser 400 is seen from an upper magnet fixer 402 side.

FIG. 2 is an explanatory view of a leaked magnetic flux when the data eraser 100 is seen from the upper magnet fixer 102 side. FIG. 3 is an explanatory view of a leaked magnetic flux when the conventional data eraser 400 is seen from the upper magnet fixer 402 side.

At first, the conventional data eraser 400 will be described. A magnetic flux leaked from the permanent magnet 412 (N pole) passes the external space and returns to the permanent magnet 414 (S pole) as shown in FIG. 3. In FIG. 3, it is premised that the disk device 10 is inserted in the data erasure area EA so as to erase data. The spindle motor 18 is disposed in the center of the rotation of the magnetic disk 22. As shown in FIG. 3, the spindle motor 18 is positioned in the area of a magnetic field formed by the permanent magnets 412 and 414 of the data eraser 400. The magnetic field shown in FIG. 3 formed by the permanent magnets 412 and 414 is on the same plane. Because the spindle motor 18 is positioned lower than this plane, the magnetic field applied to the spindle motor 18 becomes weaker than the magnetic field formed on the plane. However, whether the magnetic field applied to the spindle motor 18 is strong or weak can be presumed satisfactorily from FIG. 3.

Next, the leaked magnetic flux functions as follows in the data eraser 100 in the first embodiment. Concretely, the magnetic flux generated from the permanent magnet 112 passes the plate member 120 made of JIS SS400, which is a strong magnetic material, more often than it leaks to the external space. The magnetic flux, after passing the plate member 120, returns to the permanent magnet 114, forming a loop. More concretely, in principle, the leaked magnetic fluxes from the tips (lower ends in FIG. 2) of the permanent magnets 112 and 114 do not leak to the external space. Therefore, the leaked magnetic flux from this portion never affects the spindle motor 18 of the disk device 10 adversely. Of course, depending on the relationship among the magnetic flux density of the permanent magnets 112 and 114, and both magnetic permeability and capacity of the plate member 120, the magnetic flux from the plate member 120 will leak to the external space, although it is just a little when compared with that of the conventional data eraser 400 shown in FIG. 3.

Consequently, data erasure from the magnetic disk 22 with use of the data eraser 100 will reduce the adverse influence on the spindle motor 18 more effectively than data erasure with use of the conventional data eraser 400. In other words, the present invention enables a strong magnetic field to be applied to the magnetic disk 22 while suppressing the strength of the magnetic field applied to the spindle motor 18.

Figure 4:
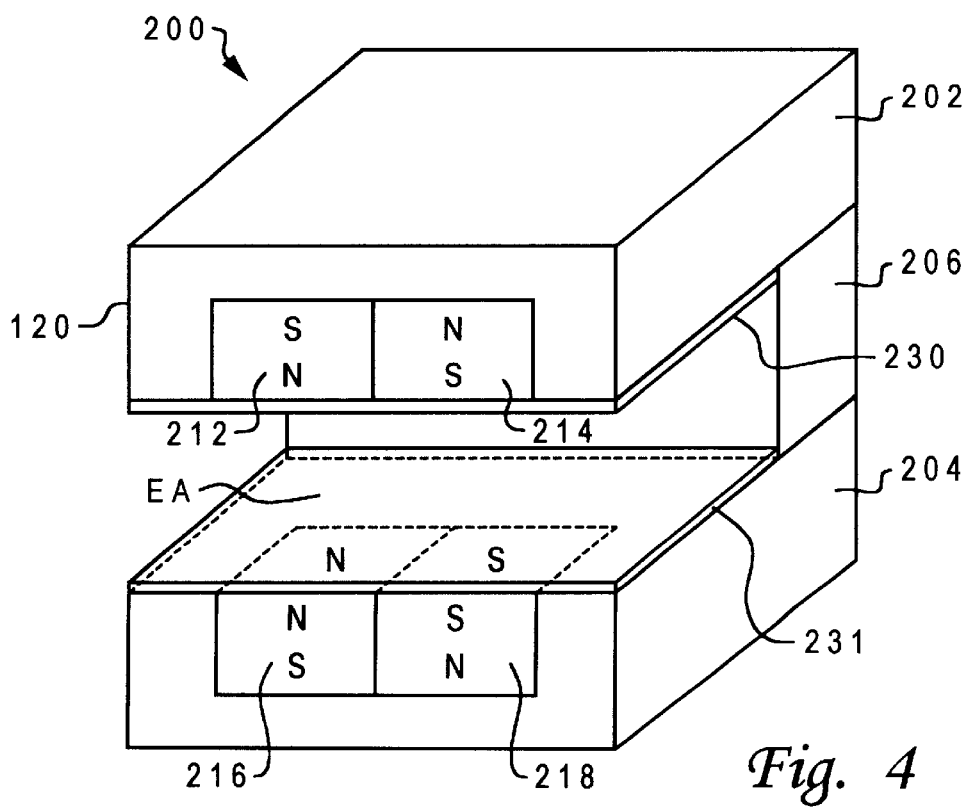
FIG. 4 is a perspective view of a data eraser 200 in the second embodiment of the present invention.

The second embodiment of the present invention is shown in FIG. 4 as a data eraser 200. As shown in FIG. 4, the basic configuration of the data eraser 200 is the same as that of the data eraser 100 in the first embodiment. Concretely, the data eraser 200 comprises an upper magnetic fixer 202, a lower magnet fixer 204, and a linkage 206. The upper magnet fixer 202 fixes permanent magnets 212 and 214 and the lower magnet fixer 204 fixes permanent magnets 216 and 218. The upper and lower magnet fixers 202 and 204, as well as the linkage 206 are made of a strong magnetic material, for example, JIS SS400 respectively. A gap between the upper and lower magnet fixers 202 and 204 becomes a data eraser area EA used to insert the disk device 10 so as to erase data from the magnetic disk 22.

The data eraser 200 is just different from the data eraser 100 in the first embodiment in that upper and lower thin plates 230 and 231 made of a strong magnetic material respectively are provided on the surfaces of the upper and lower magnet fixers 202 and 204, which face the data erasure area EA respectively. This upper thin plate 230 is in contact with both permanent magnets 212 and 214. It functions as a pole piece. The lower thin plate 231 is in contact with both permanent magnets 216 and 218. It also functions as a pole piece.

It is confirmed in the examination performed by the inventor et al that providing this pole piece makes it uniform in size of the magnetization vectors of the magnetic field (magnetic flux) formed therefrom, as well as align the magnetization vectors in orientation. Consequently, in order to erase data from the magnetic disk 22 effectively and reduce an adverse influence of the magnetic field on the spindle motor 18, the upper and lower thin plates 230 and 231 that are made of a strong magnetic material and function as a pole piece respectively should be provided just like in the data eraser 200. With this, a strong magnetic field can be applied to the magnetic disk 22 while the strength of the magnetic field applied to the spindle motor 18 is suppressed.

Figure 5:
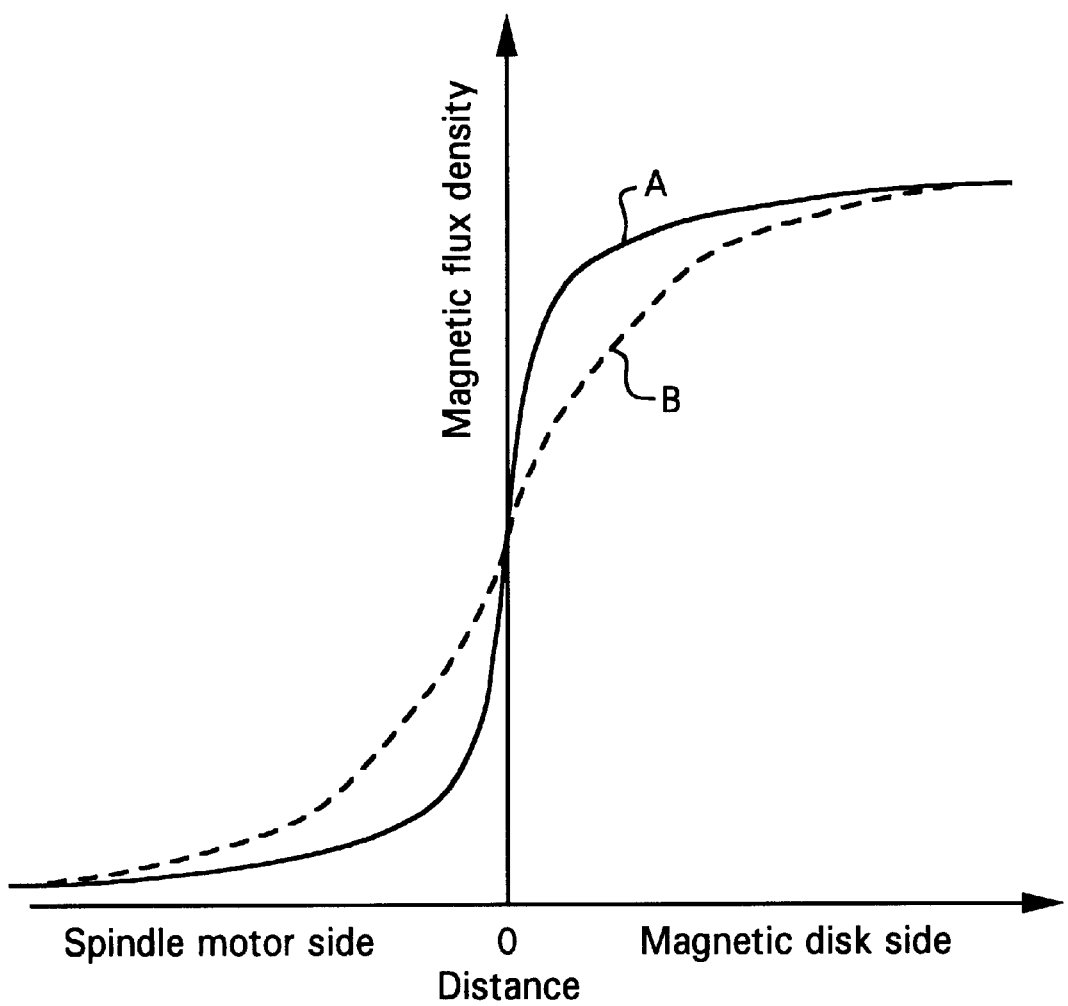
FIG. 5 shows a graph denoting the distribution of the magnetic flux in the planar direction of a disk device 10.

Hereunder, a data eraser 300 in the third embodiment of the present invention will be described. In order to erase data from the object magnetic disk surely and suppress the demagnetization of the permanent magnet of the spindle motor 18, it will be idealistic to increase the strength of the magnetic field, that is, the magnetic flux density in the area where the magnetic disk 22 exists and reduce the strength of the magnetic field in the area where the spindle motor 18 exists. FIG. 5 shows a graph in which the horizontal axis denotes a distance of the disk device 10 in the planar direction and the vertical axis denotes a magnetic flux density. In FIG. 5, it is premised that the magnetic disk 22 exists at the right side of point 0 and the spindle motor 18 exists at the left side of point 0. The magnetic flux density formed in the data eraser 300 should preferably be distributed as shown with the curve A; it is high at the magnetic disk 22 side and it is reduced rapidly at the spindle motor 18 side. On the contrary, if the magnetic flux density is high at the magnetic disk 22 side and it is not lowered so much at the spindle motor 18 side as shown with the curve B, then the situation is not appropriate to the permanent magnet of the spindle motor 18. Therefore, the shape of the data eraser 300 in this third embodiment is optimized so as to distribute the magnetic flux density as shown with the curve A in FIG. 5.

Figure 6:
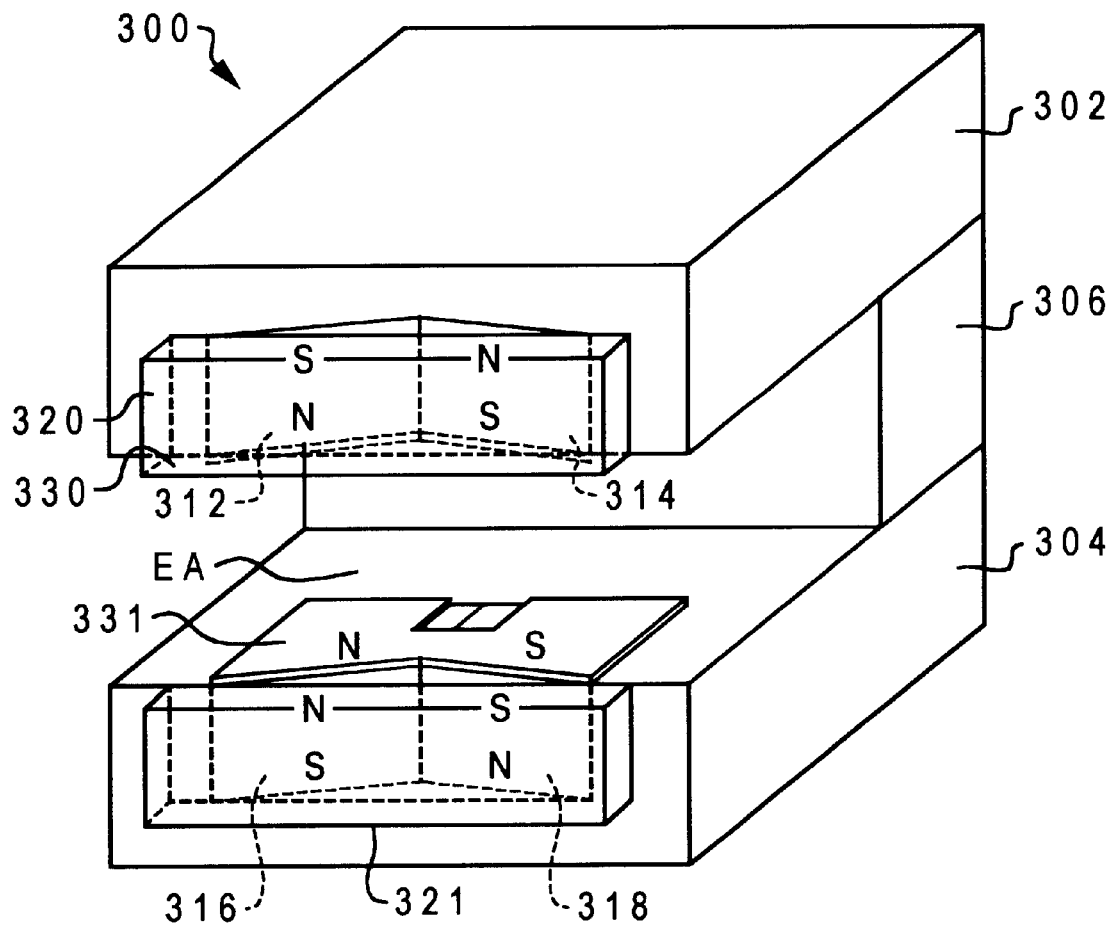
FIG. 6 is a perspective view of a data eraser 300 in the third embodiment of the present invention.
Figure 7:
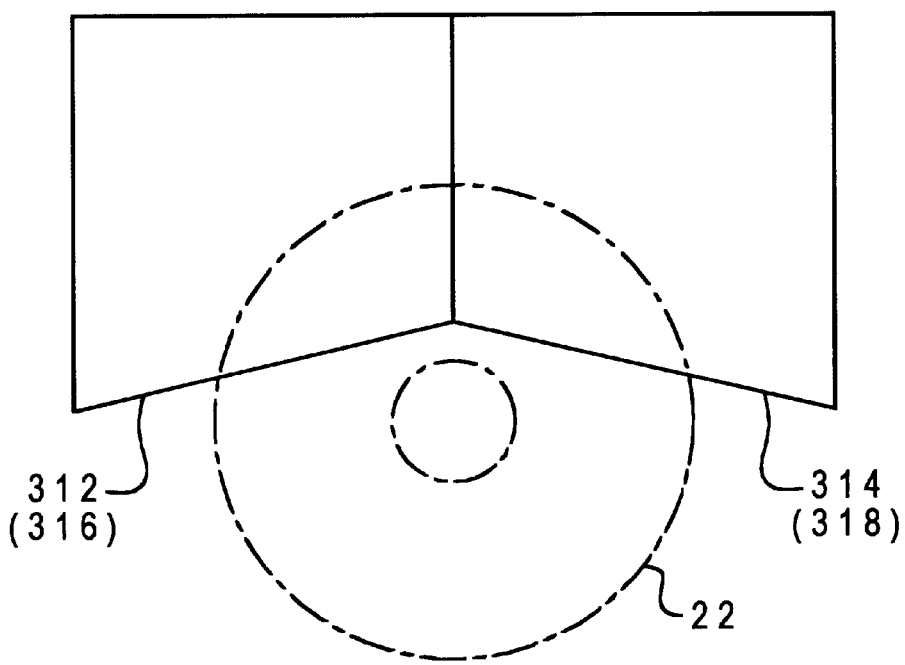
FIG. 7 is a partial top view of permanent magnets 312 and 314 (316 and 318) of the data eraser 300.
Figure 8:
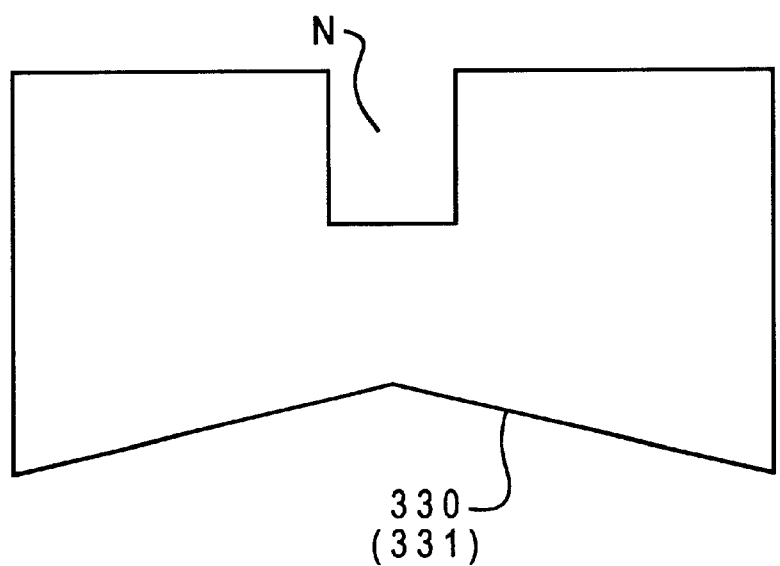
FIG. 8 is a top view of an upper thin plate 330 (lower thin plate 331) of the data eraser 300.

FIG. 6 shows a perspective view of the data eraser 300. FIG. 7 shows a partial top view of the permanent magnets 312 and 314(316 and 318) of the data eraser 300. FIG. 8 shows a top view of an upper thin plate 330 (lower thin plate 331) of the data eraser 300.

As shown in FIG. 6, the basic configuration of the data eraser 300 is the same as that of the data eraser 200 in the second embodiment. Concretely, the data eraser 300 comprises an upper magnet fixer 302, a lower magnet fixer 304, and linkage 306. The upper magnet fixer 302 fixes permanent magnets 312 and 314 and the lower magnet fixer 304 fixes permanent magnets 316 and 318. The upper and lower magnet fixers 302 and 304, as well as the linkage 306 are made of a strong magnetic material, for example, JIS SS400 respectively. A gap formed between the upper and lower magnet fixers 302 and 304 forms a data erasure area EA used to insert the disk device 10 so as to erase data from the magnetic disk 22. In this embodiment, plate members 320 and 321 made of a strong magnetic material, for example, JIS SS400 respectively are provided at the tip of each of the permanent magnets 312, 314, 316, and 318. These plate members 320 and 321 are equivalent to the plate members 120 and 121 in the first embodiment.

The data eraser 300 is different from the data eraser 200 in the second embodiment in the shapes of the permanent magnets 312, 314, 316, and 318, as well as in the shapes of the upper and lower thin plates 330 and 331 made of a strong magnetic material respectively and provided on the surfaces of the upper and lower magnet fixers 302 and 304, which face the data erasure area EA respectively.

The permanent magnets 212, 214, 216, and 218 used for the data eraser 200 in the second embodiment are all rectangular solids, but the permanent magnets 312 and 314(316 and 318) used for the data eraser 300 in the third embodiment are trapezoidal at plane respectively as shown in FIG. 7. And, the permanent magnets 312 and 314(316 and 318) are disposed so that their short sides adjoin. Consequently, those permanent magnets are increased in volume from the boundary between them towards outside (the right-left direction in Figure).

FIG. 7 also shows how the magnetic disk 22 is disposed so as to erase data therefrom. When data is to be erased from the magnetic disk 22, the rotary shaft of the magnetic disk 22 is disposed at the boundary between the permanent magnets 312 and 314(316 and 318) or around the boundary. In a top view, therefore, the projected area of each of the permanent magnets 312 and 314(316 and 318) is increased from the rotation center of the magnetic disk 22 in the right-left direction with respect to the magnetic disk 22.

FIG. 8 shows an upper thin plate 330 (lower thin plate 331) that functions as a pole piece. Except for a notch N provided newly in this embodiment, the top view of the upper thin plate 330 (lower thin plate 331) is almost the same as the top view of the permanent magnets 312 and 314 (316 and 318) disposed in parallel as shown in FIG. 7. If the upper thin plate 330 (lower thin plate 331) is disposed on the permanent magnets 312 and 314 (316 and 318) respectively, the upper thin plate 330 (lower thin plate 331) covers the surfaces of the permanent magnets 312 and 314 (316 and 318) except for the notch N as shown in FIG. 6. The upper thin plate 330 (lower thin plate 331) covering the permanent magnets 312 and 314 (316 and 318) functions as a pole piece.

The magnetization vectors of the magnetic flux leaked from this portion can be aligned in orientation. Because the upper thin plate 330 (lower thin plate 331) is made of JIS SS400, which is a strong magnetic material, part of the magnetic flux leaked from the permanent magnet 312(316) passes through the upper thin plate 330 (lower thin plate 331). Consequently, the amount of the magnetic flux leaked to the external space is reduced. On the contrary, at a portion of the upper thin plate 330 (lower thin plate 331), which is equivalent to the notch N, the whole magnetic flux leaked from the permanent magnet 312 (316) leaks to the external space as is. Concretely, the strength of the magnetic field from a portion covered by the upper thin plate 330 (lower thin plate 331) is weaker than that from the portion equivalent to the notch N. This means that the magnetic field is weaker in the center of the rotation of the magnetic disk 22, that is, in an area close to the spindle motor 18 if the disk device 10 is disposed in the data erasure area EA so as to erase data. Consequently, while the disk device 10 is inserted, the notch N should preferably be provided at a place towards the rim of the magnetic disk 22. The present invention is not limited only to that disposition, of course.

Figure 9:
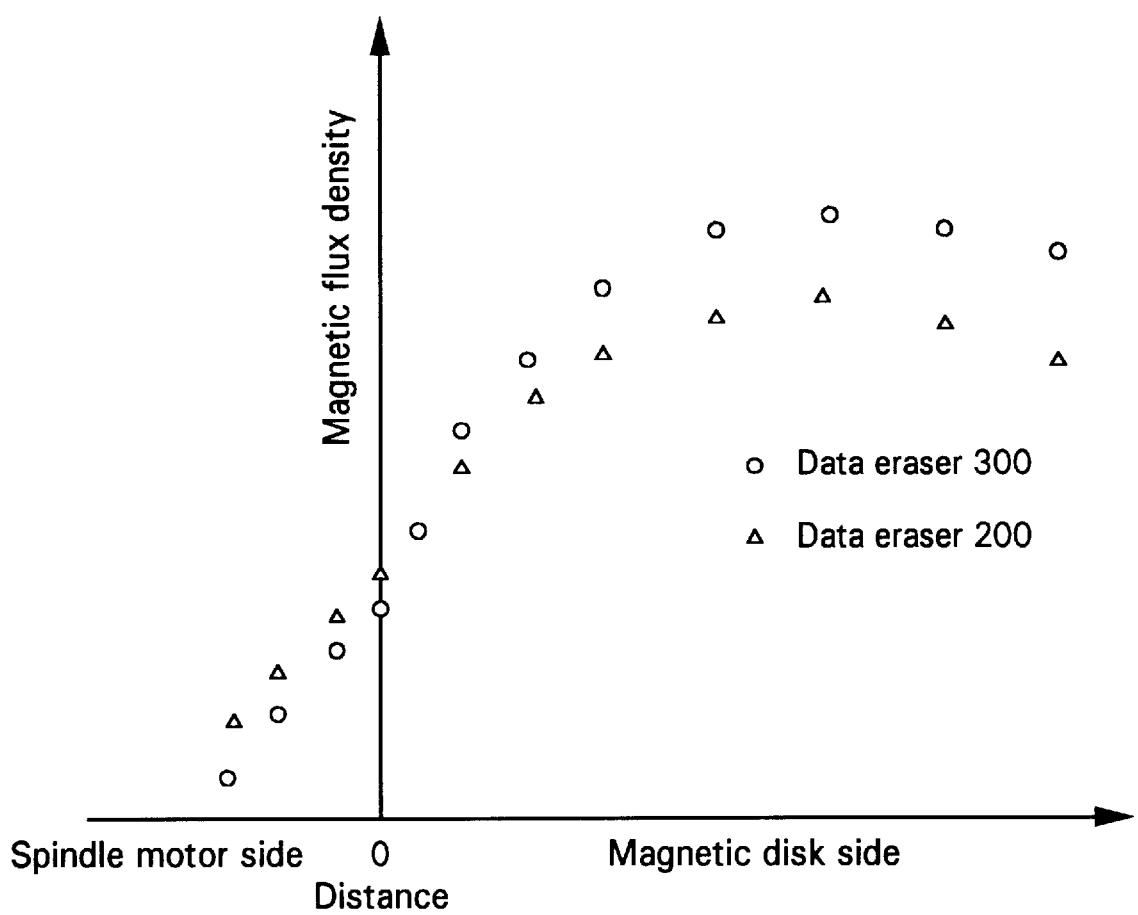
FIG. 9 is a graph denoting results of the simulation for the distribution of leaked magnetic fluxes from the data erasers 300 and 200.

A simulation is done for the distribution of leaked magnetic flux from the data eraser 300 and the data erasure 200 structured as described above respectively. FIG. 9 shows the simulation results. In FIG. 9, the horizontal axis denotes a distance and the vertical axis denotes a magnetic flux density. And, the magnetic disk 22 exists at the right side of point 0 of the horizontal axis and the spindle motor 18 exists at the left side. As shown in FIG. 9, at the side of the magnetic disk 22, the magnetic flux density is higher at the data eraser 300 than at the data eraser 200. However, at a place where the spindle motor 18 exists, the magnetic flux density is lower at the data eraser 300 than at the data eraser 200. Consequently, it would be understood apparently that the data eraser 300 is more favorable for erasing data from the magnetic disk 22 and suppressing the demagnetization of the permanent magnet of the spindle motor 18.

Although the present invention has been described on the basis of the first to third embodiments, those embodiments are just decided to be preferred at present and the present invention is not limited only to those embodiments.

For example, in the first to third embodiments, a pair of magnetic field generating means are provided; one of the magnetic field generating means consists of permanent magnets 112 and 114 and the other magnetic field generating means consists of permanent magnets 116 and 118. However, any one of those magnetic field generating means can erase data from the magnetic disk 22.

Furthermore, although the upper and lower magnet fixers 102 and 104, as well as the linkage 106 are provided unitarily in the first embodiment, they may be created separately, then united to each another. Of course, the shape of each of those components is not limited only to that disclosed above. It is also true for permanent magnets.

As described above, the present invention can provide a data eraser that can apply a strong magnetic field to the magnetic disk while suppressing the strength of the magnetic field applied to the spindle motor.

What is claimed is:

1. A data eraser for erasing data stored on a magnetic disk, comprising:
    a magnetic field generator having two permanent magnets forming different poles that are adjoining on both an obverse and a reverse of the magnetic field respectively;
    a yoke disposed on a surface other than the obverse and the reverse of the magnetic field generator; and wherein
    the yoke is disposed to completely cover the two permanent magnets other than facing surfaces of the two permanent magnets which are located in a gap therebetween which serves as a data erasing area.

2. The data eraser of claim 1 wherein a pair of the magnetic field generators are disposed so that their surfaces on which the different poles are adjoining are opposed to each other with the gap therebetween; and
    the magnetic disk is inserted in the gap, thereby applying a magnetic field to the magnetic disk.

3. The data eraser of claim 2 wherein a pair of the magnetic field generators are disposed so that different poles formed on each of the two permanent magnets face their opposed poles, respectively.

4. The data eraser of claim 2 wherein the data eraser has a fixer for holding a pair of the magnetic field generators with the gap therebetween, wherein the fixer functions as the yoke.

5. A data eraser for erasing data stored on a magnetic disk, comprising:
    a magnetic field generator in which two permanent magnets are set, the two permanent magnets forming different pales that are adjoining on both an obverse and a reverse of the magnetic field respectively;
    a pole piece provided on one of the obverse and the reverse of the magnetic field generator, wherein data stored on the magnetic disk is erased by a magnetic field formed by a magnetic flux leaked from a surface on which the pole piece is located; and wherein
    the pole piece comprises two plates that are disposed to completely cover facing surfaces of the two permanent magnets, the facing surfaces being located in a gap between the two permanent magnet which serves as a data erasing area.

6. The data eraser of claim 5 wherein the pole piece aligns magnetization vectors in orientation, the magnetization vectors being generated by the magnetic field generator.

7. The data eraser of claim 6 wherein the magnetic field consists mainly of a component oriented in parallel to the magnetic disk in an area where the magnetic disk is disposed during data erasure.

8. The data eraser of claim 5 wherein a pair of the magnetic field generators are disposed so that their surfaces on which different poles are adjoining are opposed to each other with the gap therebetween; and
    the pole piece is located on each of the opposed surfaces of the pair of the magnetic field generators.

9. A data eraser for erasing data stored on a magnetic disk, comprising:
    a magnetic field generator in which two flat permanent magnets are set, the two flat permanent magnets forming different poles that are adjoining on both an obverse and a reverse of the magnetic field, respectively, and each of the permanent magnets having a facing surface and perpendicular surfaces that are perpendicular to their respective facing surfaces;
    a fixer for fixing the magnetic field generator, wherein the two flat permanent magnets are increased respectively in volume from a boundary between them; and wherein
    the fixer is mounted to the magnetic field generator to completely cover a set of surfaces selected from the group consisting of the facing surfaces and the perpendicular surfaces.

10. The data eraser of claim 9 wherein the data eraser applies a magnetic field to the magnetic disk by disposing a pair of the magnetic field generators so that their surfaces on which the different poles are adjoining are opposed to each other with a predetermined gap therebetween, and the magnetic disk is inserted into the predetermined gap; and wherein
    the magnetic disk is inserted into the predetermined gap so that a center of the rotation of the magnetic disk is positioned at the boundary between adjoining magnets.

11. The data eraser of claim 9 wherein the magnetic field is oriented towards a tangent line of the magnetic disk.

12. A data eraser for erasing data stored on a magnetic disk loaded in a disk device, comprising:
    a magnetic field generator in which two flat permanent magnets are set, the two flat permanent magnets forming different poles that are adjoining on both an obverse and a reverse of the magnetic field respectively;
    a pole piece having a notch on part of itself and disposed on one of the obverse and the reverse of the magnetic field generator; and wherein
    the two flat permanent magnets are increased respectively in volume from one of a boundary between them and around the boundary towards an outside.

13. The data eraser of claim 12 wherein the data eraser applies a magnetic field to the magnetic disk by disposing a pair of the magnetic field generators so that their surfaces on which the different poles are adjoining are opposed to each other with a predetermined gap therebetween, and the disk device is inserted in the predetermined gap; and wherein
    the notch of the pole piece is formed closer towards a rim of the magnetic disk while the disk device is inserted into the predetermined gap.

* * * * *

UNITED STATES PATENT AND TRADEMARK OFFICE
CERTIFICATE OF CORRECTION

PATENT NO.   : 6,594,099 B2
DATED        : July 15, 2003
INVENTOR(S)  : Seriwaza It is certified that error appears in the above-identified patent and that said Letters Patent is hereby corrected as shown below:

<u>Column 11,</u>
Line 47, please replace the word "pales" with the word -- poles --.

Signed and Sealed this

Eleventh Day of November, 2003

JAMES E. ROGAN
*Director of the United States Patent and Trademark Office*